US006963539B2

(12) United States Patent
Mukherjee et al.

(10) Patent No.: US 6,963,539 B2
(45) Date of Patent: Nov. 8, 2005

(54) METHOD AND APPARATUS FOR PROVIDING A SERVICE LEVEL GUARANTEE IN A COMMUNICATION NETWORK

(75) Inventors: Biswanath Mukherjee, Davis, CA (US); Jing Zhang, Davis, CA (US); Keyao Zhu, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 302 days.

(21) Appl. No.: 10/365,311

(22) Filed: Feb. 12, 2003

(65) Prior Publication Data

US 2004/0156316 A1 Aug. 12, 2004

(51) Int. Cl.[7] .......................... H04L 1/00; H04L 12/26
(52) U.S. Cl. ...................................... 370/238; 370/400
(58) Field of Search ................................ 370/225, 230, 370/389, 400, 401, 468, 223, 351, 235–238; 709/201, 217, 226, 239, 240, 241

(56) References Cited

U.S. PATENT DOCUMENTS 6,154,444 A * 11/2000 Masuo et al. ............... 370/225
6,404,735 B1 * 6/2002 Beshai et al. ............... 370/230
6,667,956 B2 * 12/2003 Beshai et al. ............... 370/238
6,683,852 B2 * 1/2004 Nagarajan et al. .......... 370/235
2002/0194316 A1 * 12/2002 Gous et al. ................. 709/221
2003/0063624 A1 * 4/2003 Nagarajan et al. .......... 370/468
2003/0118024 A1 * 6/2003 Lee et al. ................ 370/395.1
2003/0118027 A1 * 6/2003 Lee et al. .............. 370/395.21
2004/0111506 A1 * 6/2004 Kundu et al. ............... 709/223

* cited by examiner

*Primary Examiner*—Ajit Patel
*Assistant Examiner*—Chirag Shah
(74) *Attorney, Agent, or Firm*—Park, Vaughan & Fleming LLP; Edward J. Grundler

(57) ABSTRACT

One embodiment of the present invention provides a system that provides a guaranteed level of availability in a communication network. During operation, the system receives a connection request that includes a specified reliability. Next, the system determines multiple candidate routes through a network to satisfy the connection request, wherein each of these candidate routes passes through a set of links that form a path through the network. The system then examines the candidate routes to identify a route that meets the specified reliability. The system only accepts the connection request if a route that meets the specified reliability is found.

21 Claims, 4 Drawing Sheets

METHOD AND APPARATUS FOR PROVIDING A SERVICE LEVEL GUARANTEE IN A COMMUNICATION NETWORK

BACKGROUND

1. Field of the Invention

The present invention relates to communication networks. More specifically, the present invention relates to a method and an apparatus for providing a guaranteed level of availability in a communication network.

2. Related Art

Network communication technologies provide for a wide range of interconnections and bandwidths. For example, wavelength-division multiplexing (WDM) technology enables a single optical fiber to support over one hundred wavelength channels, each of which can operate at a bandwidth of several gigabits per second (Gbps). Providing this amount of capacity through a single optical fiber has significant advantages, such as greatly reduced cost. However, a failure in such an optical network, e.g., a fiber cut or fiber conduit cut, can lead to the loss of a huge amount of data (several terabits per second (Tbps) to several petabits per second (Pbps)), and can result in penalties under a service level agreement.

When a connection through the WDM network is requested, a service provider and a client typically enter into a service level agreement (SLA), which provides a specified service level to the client, and provides penalties on the provider if the service level is not met. The service provider receives compensation based, inter alia, upon the service level requested and the level of penalties specified in the SLA. Upon acceptance of the SLA by both provider and client, the circuit is provisioned.

In the traditional connection-provisioning scheme, a shortest path (based on the link cost) between the source node and the destination node is chosen to route a given connection request. Depending on different traffic-engineering considerations, different cost functions can be applied to network links, such as a constant 1 for each link (to minimize hop distance), the length of the link (to minimize delay), the fraction of the available capacity on the link (to balance network load), etc. However, this traditional connection-provisioning scheme is unaware of any connection-availability requirements. Consequently, the route computed by a shortest-path algorithm may not satisfy the SLA, because the route may not be reliable enough.

FIG. 1 illustrates a shortest path through a WDM network, which does not meet the availability requirement of an SLA. A connection request is made from node 0 to node 5 and this request specifies an availability requirement of 95%. In FIG. 1, the integers next to the links represent the link costs. In this example, the route (0, 3, 4, 5), route 1, is indicated by the dashed lines and is the least-cost path (cost=3).

Unfortunately, this least-cost path does not consider connection availability requirements. Referring to FIG. 1, the percentages next to the links represent the estimated availability of each link. Note that each of the links has an availability of 99%, except for the link between nodes 4 and 5, which has an availability of 90%. This low availability can be the result of a number of factors, such as old fibers, fibers routed through areas of heavy construction, etc. The estimated availability of route 1 is the product of the availabilities of the links that the connection traverses. For route 1, the availability is 88.21%, which is less than the required availability in the SLA.

Hence, what is needed is a method and an apparatus for providing a guaranteed level of availability in a communication network.

SUMMARY

One embodiment of the present invention provides a system that provides a guaranteed level of availability in a communication network. During operation, the system receives a connection request that includes a specified reliability. Next, the system determines multiple candidate routes through a network to satisfy the connection request, wherein each of these candidate routes passes through a set of links that form a path through the network. The system then examines the candidate routes to identify a route that meets the specified reliability. The system only accepts the connection request if a route that meets the specified reliability is found.

In a variation of this embodiment, the system examines the candidate routes to identify an adequate route with a minimum reliability that exceeds the specified reliability.

In a further variation, the system examines the candidate routes to identify a most-reliable route.

In a further variation, identifying the most-reliable route involves first obtaining a reliability value for each link in the candidate routes. These reliability values are derived from statistical data for the communication network. The system then computes a cost for each link by computing the negative logarithm of the reliability value for each link. The system uses these costs in a shortest-path computation to determine a least-cost route for the connection request. This least-cost route is the most reliable route.

In a further variation, the system uses multiple independent routes to meet the specified reliability.

In a further variation, the system uses multiple links between specified nodes on the route to meet the specified reliability.

In a further variation, the system uses multiple sub-paths between a source and a destination on the route to meet the specified reliability.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communication network, such as the Internet.

Highest Availability Path

Figure 1:
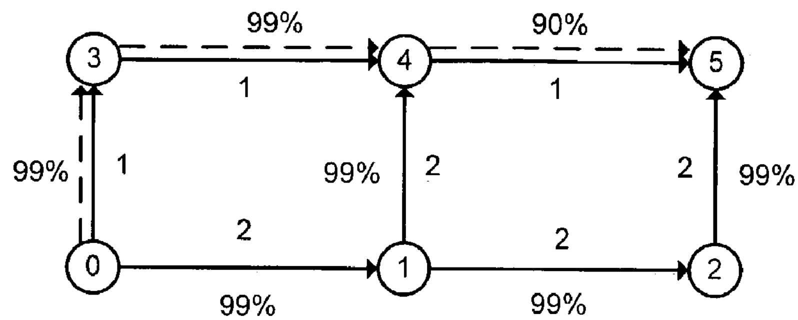
FIG. 1 illustrates a shortest path through a WDM network, which does not meet the availability requirement of an SLA.
Figure 2:
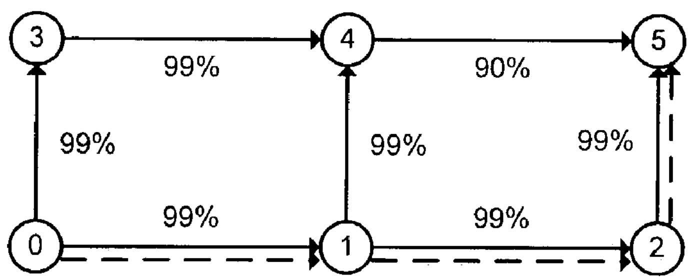
FIG. 2 illustrates a highest availability path through a WDM network in accordance with an embodiment of the present invention.

FIG. 2 illustrates a highest availability path through a WDM network in accordance with an embodiment of the present invention. The network illustrated in FIG. 2 includes the same path availabilities as FIG. 1. The route through nodes 0, 1, 2, 5, route 2, is the path with the highest availability and is indicated by the dashed lines. The estimated availability of this route is the product of the availabilities of the individual links. In this case the estimated availability of this route is 97.03%, which is greater than the availability of 95% specified in the SLA. Route 2, therefore, provides an acceptable path through the network, which meets the SLA guarantee.

Availability Values

Figure 3:
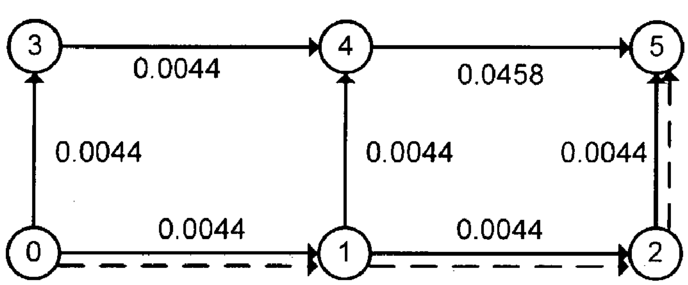
FIG. 3 illustrates availability values for links of a WDM network in accordance with an embodiment of the present invention.

FIG. 3 illustrates availability values for links of a WDM network in accordance with an embodiment of the present invention. The network in FIG. 3 is identical to the networks of FIGS. 1 and 2. The availability values, however, have been converted into the negative logarithm of the availability percentages. This allows the use of a shortest path computation, such as Dijkstra's technique, to find the highest availability route between the source node and the destination node. Dijkstra's technique is well known in the art and will not be described herein. Alternatively, the path lengths can be calculated for each possible path between the source node and the destination node, and then ordered from shortest to longest. The system can then choose a path through the network that just meets the availability requirement. Doing this may save the path with the highest availability for a connection with more stringent availability requirements, or for a connection that provides higher penalties for not meeting the specified availability.

Multiple Independent Paths

Figure 4:
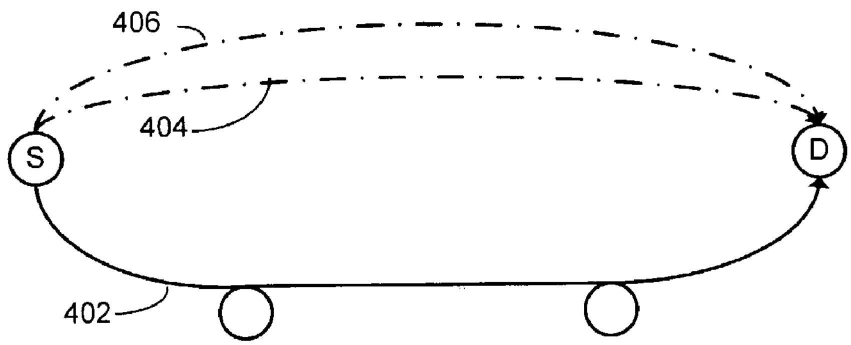
FIG. 4 illustrates multiple independent paths through a WDM network in accordance with an embodiment of the present invention.

FIG. 4 illustrates multiple independent paths through a WDM network in accordance with an embodiment of the present invention. Path 402 is the primary path between a source node and a destination node in the WDM network. The system may not be able to meet reliability requirements in the SLA using only path 402 because links in the best path have an estimated availability below what is required. In the example illustrated in FIG. 4, the system can select additional paths, such as paths 404 and 406, to supply the required availability.

Multiple Links

Figure 5:
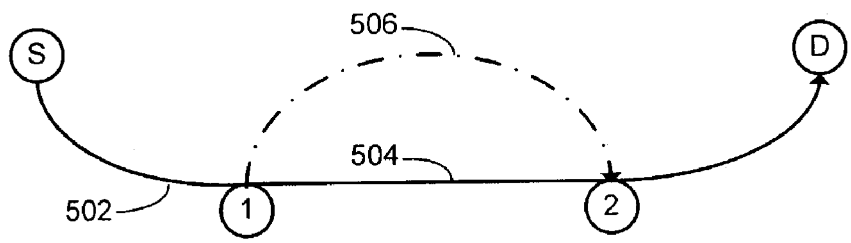
FIG. 5 illustrates multiple links between nodes of a WDM network in accordance with an embodiment of the present invention.

FIG. 5 illustrates multiple links between nodes of a WDM network in accordance with an embodiment of the present invention. Path 502 is the primary path between a source node and a destination node in the WDM network. Path 502 includes link 504 between nodes 1 and 2, which may be a low reliability link, causing path 502 to have insufficient reliability to meet the availability requirement of the SLA. Link 506 can be added between nodes 1 and 2 to provide the availability stated in the SLA. Note that more than one additional link can be provided between nodes 1 and 2.

Multiple Sub-paths

Figure 6:
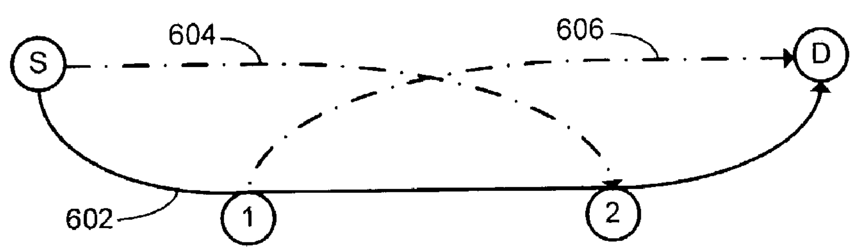
FIG. 6 illustrates multiple sub-paths through a WDM network in accordance with an embodiment of the present invention.

FIG. 6 illustrates multiple sub-paths through a WDM network in accordance with an embodiment of the present invention. Path 602 is the primary path between a source node and a destination node in the WDM network. Path 604 provides an alternate path between the source node and node 2. Path 606 provides an alternate path between node 1 and the destination node. Providing these secondary paths can provide sufficient availability between the source node and the destination node under most conditions encountered on the WDM network. Note that this technique of providing a secondary path between alternating nodes can be extended for longer paths.

Processing a Connection Request

Figure 7:
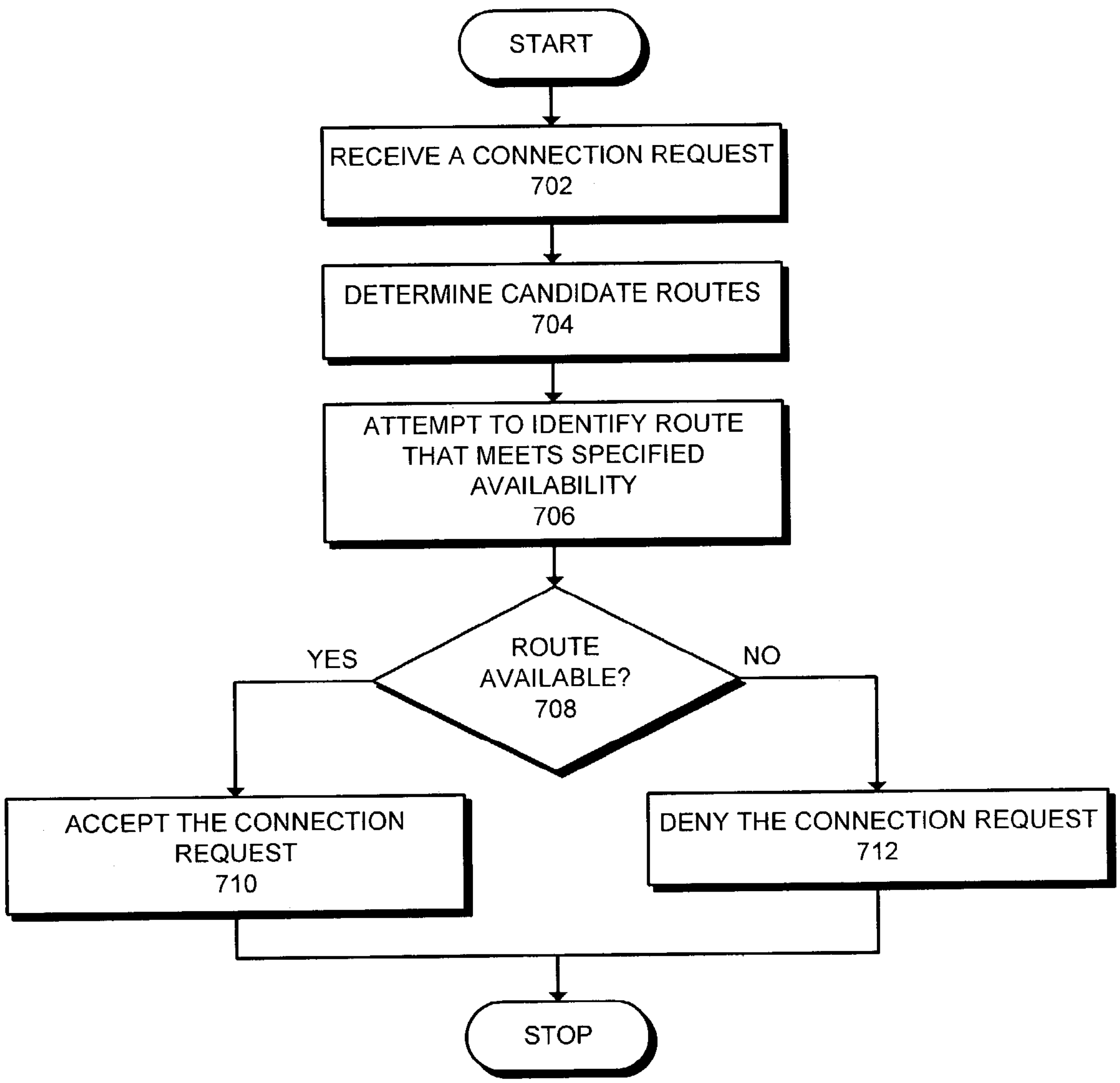
FIG. 7 presents a flowchart illustrating processing of a connection request in accordance with an embodiment of the present invention.

FIG. 7 presents a flowchart illustrating processing of a connection request in accordance with an embodiment of the present invention. The system starts when a connection request is received that includes a specified availability in the SLA (step 702). Next, the system determines possible candidate routes through the WDM network (step 704). The system then attempts to identify a route that meets the specified availability (step 706).

If a route exists that meets the specified availability (step 708), the system accepts the connection request and provisions the route (step 710). If no satisfactory route exists at step 708, the system denies the connection request (step 712).

Computing the Route with the Highest Availability

Figure 8:
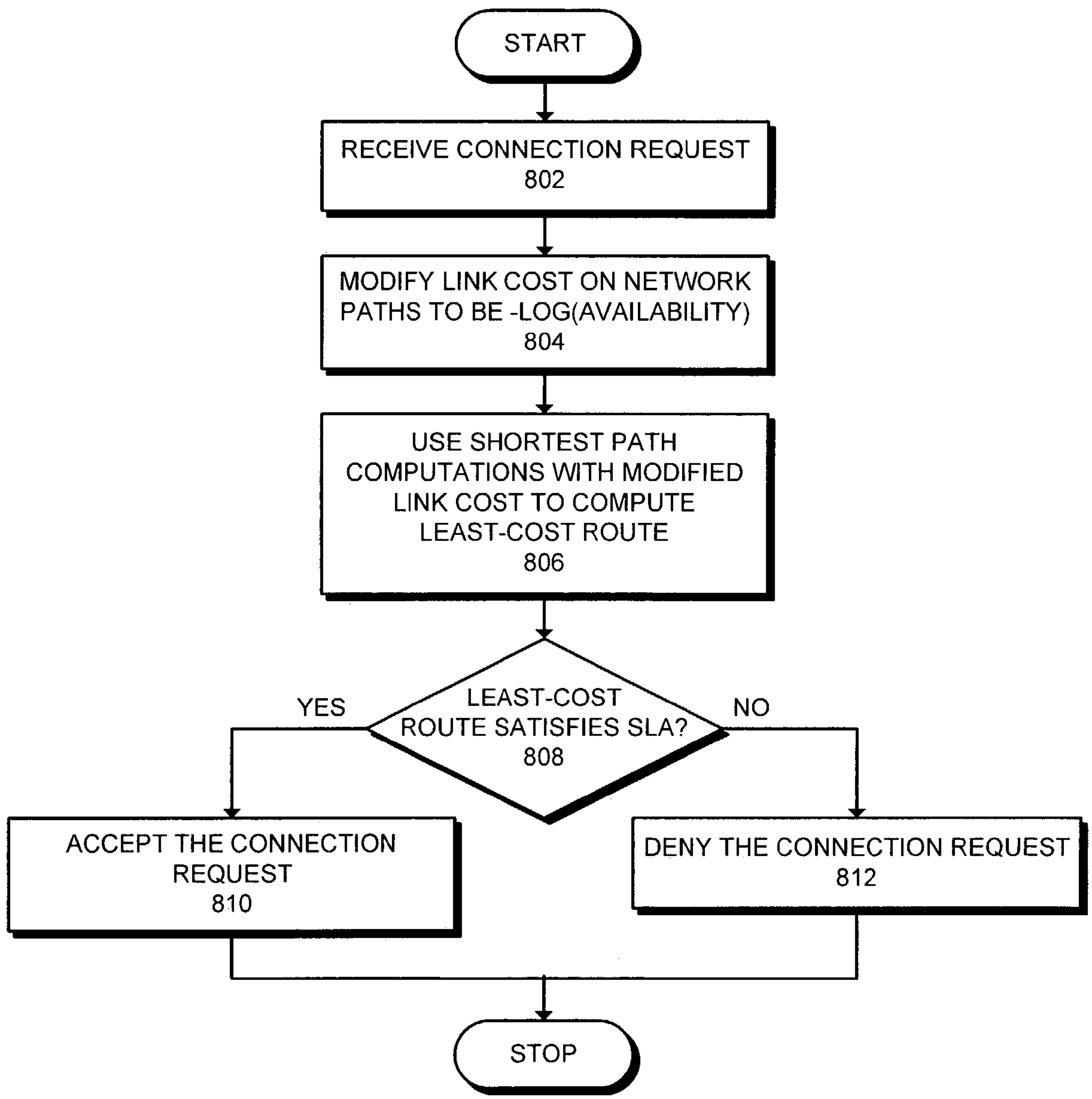
FIG. 8 presents a flowchart illustrating the process of computing the route with the highest availability through a WDM network in accordance with an embodiment of the present invention.

FIG. 8 presents a flowchart illustrating the process of computing the route with the highest availability through a WDM network in accordance with an embodiment of the present invention. The system starts when a connection request is received that includes a specified availability (step 802). Next, the system modifies the link cost on each network path to be link cost-LOG (availability) (step 804). The system then computes the least-cost route using the modified link cost in a shortest-path technique such as Dijkstra's technique (step 806). Note that steps 804 and 806 can be pre-computed prior to receiving the connection request.

Next, the system determines if the least-cost route satisfies the specified availability (step 808). Note that in an alternate embodiment, the system chooses a route that meets the specified availability but is not the least-cost route. If the least-cost route satisfies the specified availability, the system accepts the connection request (step 810). Otherwise, the system denies the connection request (step 812).

The foregoing descriptions of embodiments of the present invention have been presented for purposes of illustration and description only. They are not intended to be exhaustive or to limit the present invention to the forms disclosed.

Accordingly, many modifications and variations will be apparent to practitioners skilled in the art. Additionally, the above disclosure is not intended to limit the present invention. The scope of the present invention is defined by the appended claims.

What is claimed is:

1. A method for providing a guaranteed level of availability to satisfy service level agreement (SLA) in a communication network, comprising:

receiving a connection request, wherein the connection request includes a specified connection-reliability.

wherein the specified connection-reliability is a percentage value;

wherein the reliability value for each link in a specified route is derived from statistical data for the communication network;

determining a plurality of candidate routes through a network to satisfy the connection request, wherein each candidate route passes through a set of links that form a path through the network;

examining the plurality of candidate routes to identify a route that meets the specified connection-reliability; and accepting the connection request if a route that meets the specified connection-reliability is found.

2. The method of claim 1, further comprising examining the plurality of candidate routes to identify an adequate route, wherein the adequate route is a route with a minimum reliability that exceeds the specified connection-reliability.

3. The method of claim 1, further comprising examining the plurality of candidate routes to identify a most-reliable route.

4. The method of claim 3, wherein identifying the most-reliable route involves:

obtaining a reliability value for each link in the plurality of candidate routes;

computing a cost for each link by computing a negative logarithm of the reliability value for each link; and determining a least-cost route for the connection request by performing a shortest-path computation that uses the computed costs for each link, wherein the least-cost route is the most reliable route.

5. The method of claim 1, further comprising using multiple independent routes to meet the specified connection-reliability.

6. The method of claim 1, further comprising using multiple links between specified nodes on the route to meet the specified connection-reliability.

7. The method of claim 1, further comprising using multiple sub-paths between a source and a destination on the route to meet the specified connection-reliability.

8. A computer-readable storage medium storing instructions that when executed by a computer cause the computer to perform a method for providing a guaranteed level of availability to satisfy service level agreement (SLA) in a communication network, the method comprising:

receiving a connection request, wherein the connection request includes a specified connection-reliability, wherein the specified connection-reliability is a percentage value;

wherein the reliability value for each link in a specified route is derived from statistical data for the communication network, determining a plurality of candidate routes through a network to satisfy the connection request, wherein each candidate route passes through a set of links that form a path through the network;

examining the plurality of candidate routes to identify a route that meets the specified connection-reliability; and accepting the connection request if a route that meets the specified connection-reliability is found.

9. The computer-readable storage medium of claim 8, further comprising examining the plurality of candidate routes to identify an adequate route, wherein the adequate route is a route with a minimum reliability that exceeds the specified connection-reliability.

10. The computer-readable storage medium of claim 8, the method further comprising examining the plurality of candidate routes to identify a most-reliable route.

11. The computer-readable storage medium of claim 10, wherein identifying the most-reliable route involves:

obtaining a reliability value for each link in the plurality of candidate routes;

computing a cost for each link by computing a negative logarithm of the reliability value for each link; and determining a least-cost route for the connection request by performing a shortest-path computation that uses the computed costs for each link, wherein the least-cost route is the most reliable route.

12. The computer-readable storage medium of claim 8, the method further comprising using multiple independent routes to meet the specified connection-reliability.

13. The computer-readable storage medium of claim 8, the method further comprising using multiple links between specified nodes on the route to meet the specified connection-reliability.

14. The computer-readable storage medium of claim 8, the method further comprising using multiple sub-paths between a source and a destination on the route to meet the specified connection-reliability.

15. An apparatus for providing a guaranteed level of availability to satisfy service level agreement (SLA) in a communication network, comprising:

a receiving mechanism configured to receive a connection request, wherein the connection request includes a specified connection-reliability, wherein the specified connection-reliability is a percentage value;

wherein the reliability value for each link in a specified route is derived from statistical data for the communication network.

a determining mechanism configured to determine a plurality of candidate routes through a network to satisfy the connection request, wherein each candidate route passes through a set of links that form a path through the network;

an examining mechanism configured to examine the plurality of candidate routes to identify a route that meets the specified connection-reliability; and an accepting mechanism configured to accept the connection request if a route that meets the specified connection-reliability is found.

16. The apparatus of claim 15, wherein the examining mechanism is further configured to examine the plurality of candidate routes to identify an adequate route, wherein the adequate route is a route with a minimum reliability that exceeds the specified connection-reliability.

17. The apparatus of claim 15, wherein the examining mechanism is further configured to examine the plurality of candidate routes to identify the most reliable route.

18. The apparatus of claim 17, further comprising:

an obtaining mechanism configured to obtain a reliability value for each link in the plurality of candidate routes; and a computing mechanism configured to compute a cost for each link by computing a negative logarithm of the reliability value for each link; and wherein the determining mechanism is further configured to determine a least-cost route for the connection request by performing a shortest-path computation that uses the computed costs for each link, wherein the least-cost route is a most reliable route.

19. The apparatus of claim 15, further comprising a route using mechanism configured to use multiple independent routes to meet the specified connection-reliability.

20. The apparatus of claim 15, further comprising a route using mechanism configured to use multiple links between specified nodes on the route to meet the specified connection-reliability.

21. The apparatus of claim 15, further comprising a route using mechanism configured to use multiple sub-paths between a source and a destination on the route to meet the specified connection-reliability.

* * * * *